United States Patent [19]

Cardenas

[11] Patent Number: 5,495,969
[45] Date of Patent: Mar. 5, 1996

[54] RECREATIONAL VEHICLE PORTABLE GUN RACK SYSTEM

[76] Inventor: John Cardenas, 339 W. Norman Ave., Arcadia, Calif. 91007

[21] Appl. No.: 298,789

[22] Filed: Aug. 31, 1994

[51] Int. Cl.⁶ ..................................................... B60R 7/14
[52] U.S. Cl. .......................... 224/275; 224/549; 224/913; 211/64; 211/195
[58] Field of Search ..................... 224/275, 913, 224/42.39, 42.4, 549, 922, 917.5; 211/64, 195; 248/528

[56] References Cited

U.S. PATENT DOCUMENTS

| | | | |
|---|---|---|---|
| D. 162,207 | 2/1951 | Mettenleiter | 224/913 |
| 1,873,471 | 8/1932 | Peterson | 248/528 |
| 2,775,351 | 12/1956 | Johnson et al. | |
| 2,797,033 | 6/1957 | Rasbach | 224/913 |
| 3,014,759 | 12/1961 | Bing | 224/275 |
| 3,261,521 | 7/1966 | Meccico et al. | |
| 3,477,586 | 11/1969 | Haluska | |
| 3,497,077 | 2/1970 | Sjostrand | |
| 3,701,504 | 10/1972 | Woods et al. | 248/528 |
| 3,876,078 | 4/1975 | Gomes et al. | |
| 4,131,202 | 12/1978 | Hansen | |
| 4,260,091 | 4/1981 | French et al. | 224/913 |
| 4,369,904 | 1/1983 | Christensen | 224/913 |
| 4,383,626 | 5/1983 | Weinblatt | 224/275 |
| 4,479,322 | 10/1984 | Koppel | 248/528 |
| 4,696,461 | 9/1987 | Zelinski | 211/64 |
| 4,852,780 | 8/1989 | Woodbury | |
| 4,995,537 | 2/1991 | Thedieck | |

FOREIGN PATENT DOCUMENTS

| | | | |
|---|---|---|---|
| 2636356 | 3/1990 | France | 211/195 |
| 1434 | of 1902 | United Kingdom | 211/64 |

*Primary Examiner*—Henry J. Recla
*Assistant Examiner*—Charles R. Eloshway
*Attorney, Agent, or Firm*—Curtis L. Harrington

[57] ABSTRACT

A gun rack engages the rear of the back seat of a sports vehicle and enables weapons to be carried in a manner tilting toward the front of the vehicle. The rack has no middle struts which would interfere with the scope of rifle and thus allows the rifle to be carried scope down, a much more stable configuration. The rack of the present invention is completely foldable from and to a storage position, and contains specialized structures to enable tie down. Tie-downs are made with respect to eyelets which exist in the rear of sports vehicles, and tie down is effected through the use of quick release straps. Tie down is achieved both at the upper and lower end of the rack of the present invention. Self tying is achieved through a wrap-around strap, or through a decorative over cover. The decorative over cover helps to disguise the presence of the weaponry and thus to reduce the incidence of theft.

14 Claims, 4 Drawing Sheets

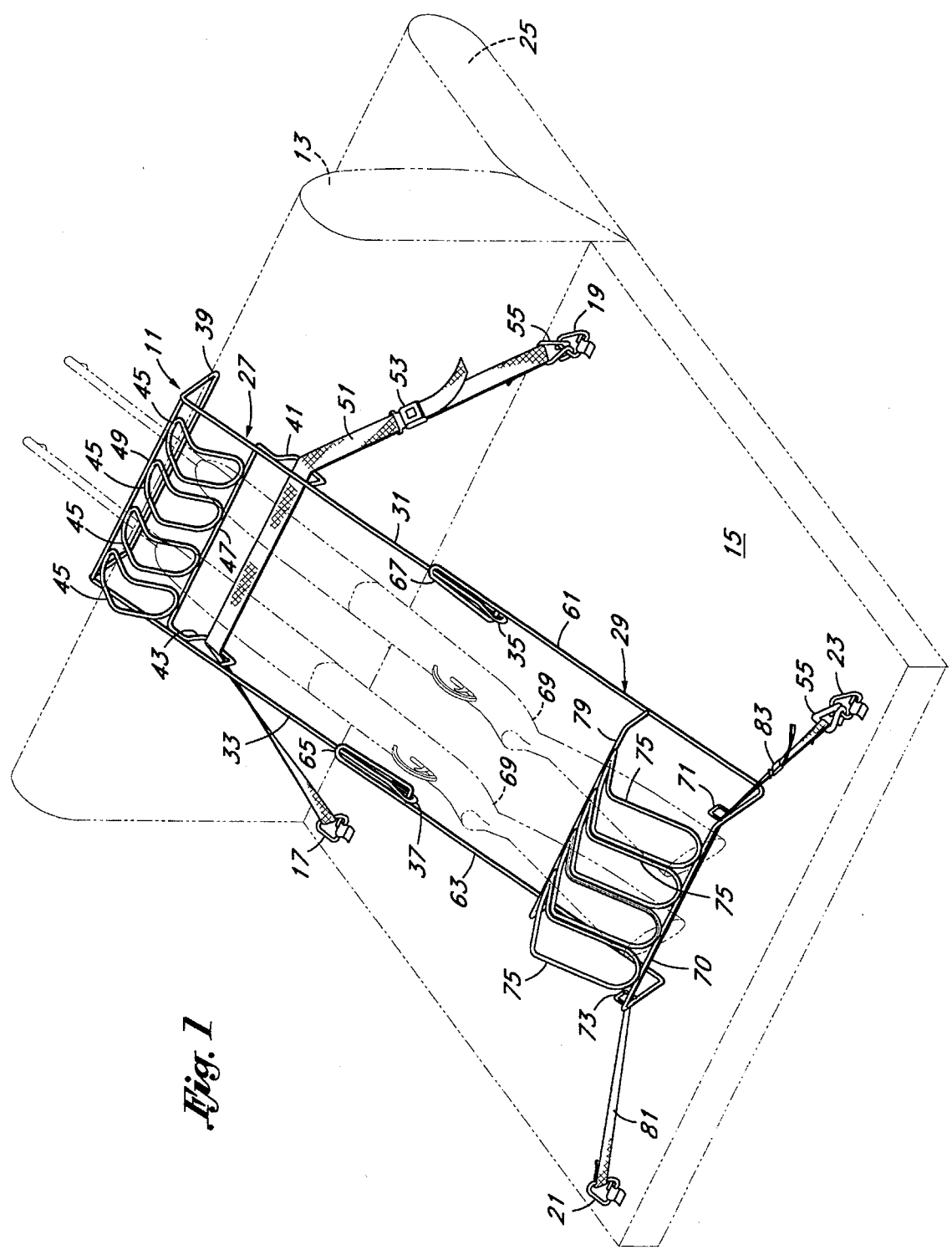

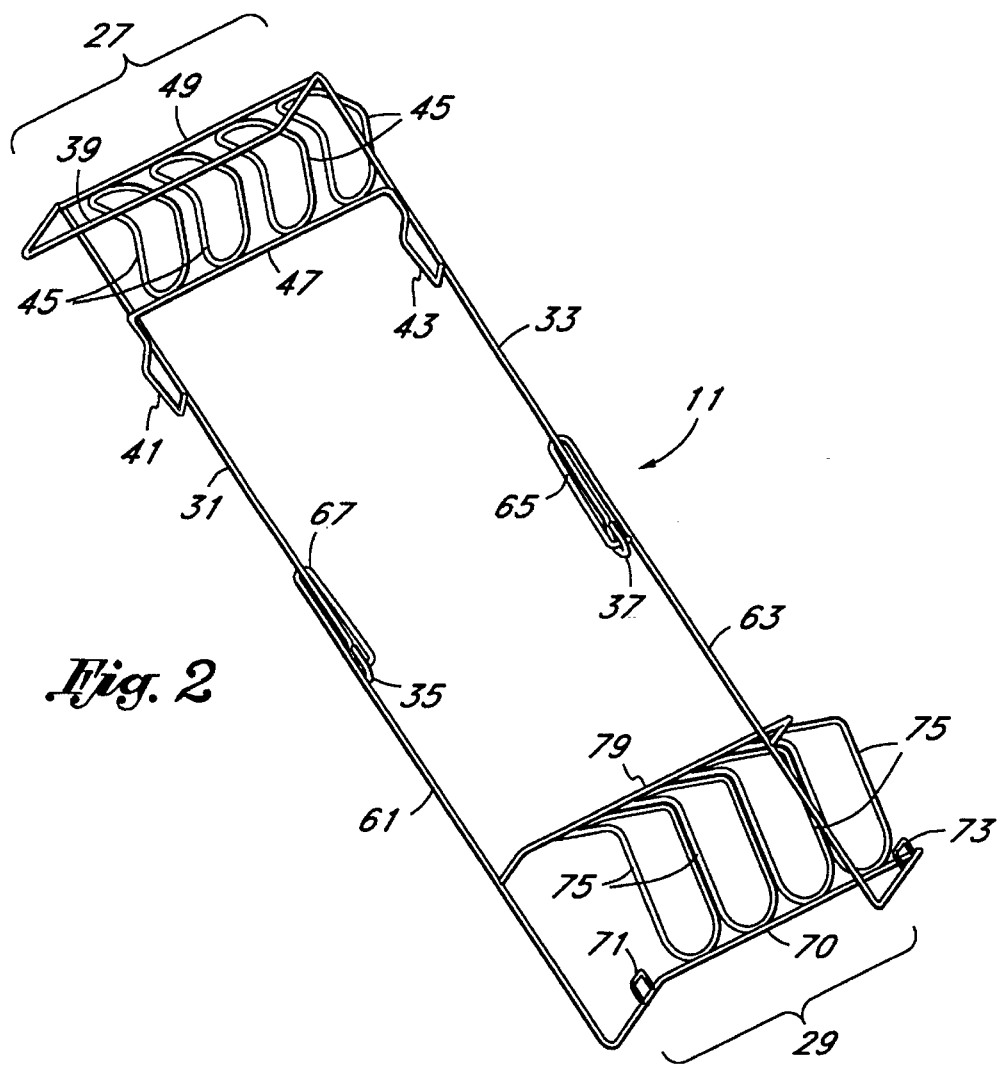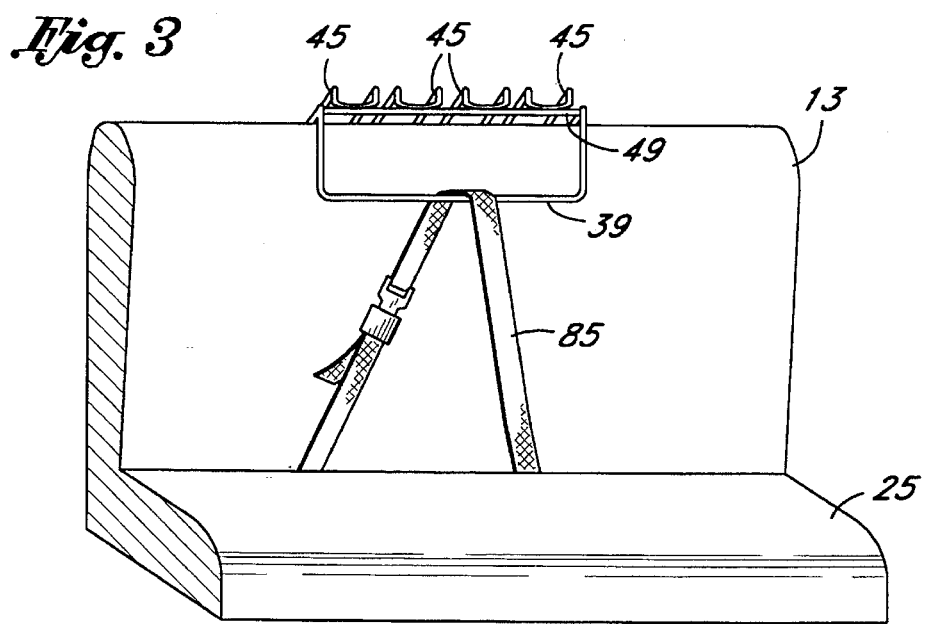

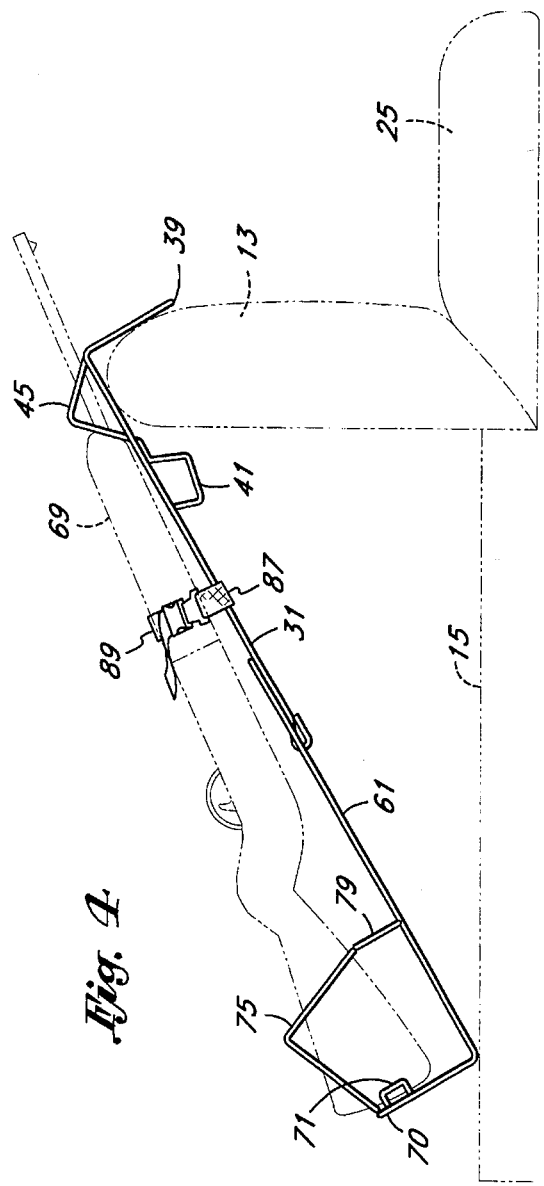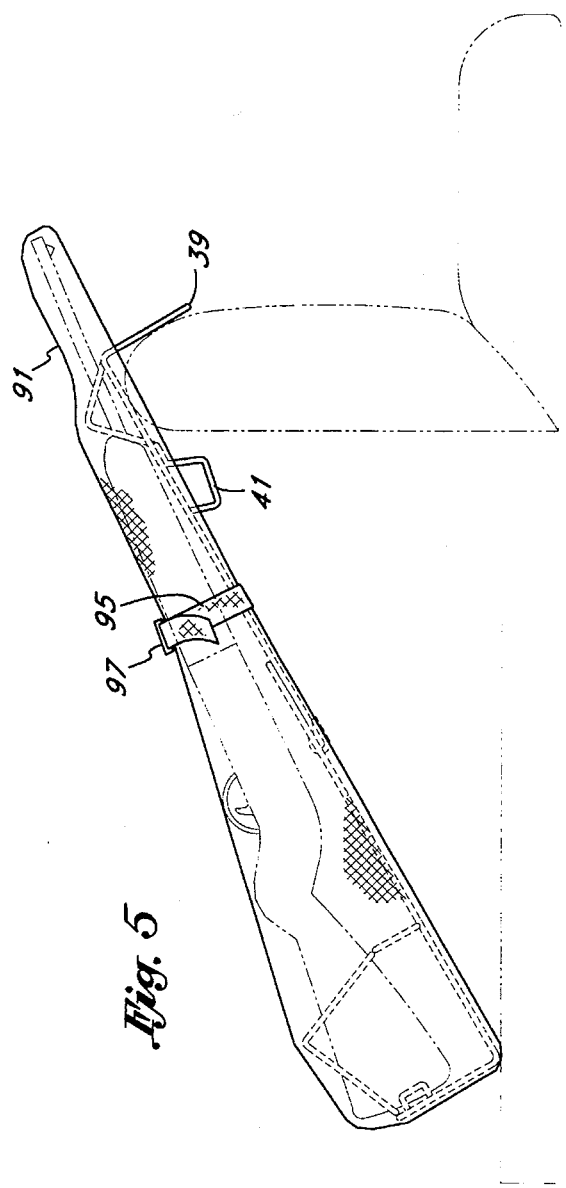

RECREATIONAL VEHICLE PORTABLE GUN RACK SYSTEM

FIELD OF THE INVENTION

The present invention relates to the field of support structures for safely carrying rifles and shotguns. More specifically electronic devices. More specifically, the present invention relates to a system, especially useful in recreational vehicles having an extended behind seat storage space, for safely, securely, and stealthily storing rifles and shotguns both to make them ready for use and for disguising their presence to reduce the likelihood of theft.

BACKGROUND OF THE INVENTION

Gun racks have been known and used for some time, especially in pickup trucks to both store and protect long weapons, including rifles, shotguns, and in some instances bows. The advantages of a gun rack are minimized movement of the weapon within the vehicle, ease of accessibility and use of the weapon, and preservation of the weapon against unwanted and harmful contact with other objects which might scratch or damage the weapons.

However, the gun racks of the past, and especially those used in trucks, display the weapons prominently. Although prominent display of an owner's fine weapons is an advantage, the increasing incidence of theft makes the prominently displayed weapon an invitation for theft. Further, and especially in the case of the recreational, or four wheel vehicle, the metal structures present in a truck are not available to mount a conventional rack behind the seat.

Other gun racks are also known which facilitate storage across the front of a seat. For example, U.S. Pat. No. 3,477,586 to L. Haluska entitled "Portable Gun Rack" and which issued on Nov. 11, 1967 discloses a rack having hook members, cross strut supports, and an adjustable length. This rack however, occupies an entire seating position or more in the back seat of a vehicle. Further, there is no method with which to tie the rack down. Even further, the rifles mounted thereon must be done in an unstable position, with the scopes disposed upwardly, and with the on-rack tie down extending through and beneath the scopes of the rifles. With this structure and method, the owner would do just about as well in laying the weapons across the seat and in the floor board, since the back seat is at least partially occupied.

U.S. Pat. No. 3,497,077 to G. D. Sjostrand entitled "Gun Rack for Vehicles" and which issued on May 29, 1968, and U.S. Pat. No. 4,852,780 to Wayne F. Woodbury entitled "Gun Rack" and which issued on Aug. 1, 1989, both disclose a single rack having a central expandable length bar. The Sjostrand device has its own strap type tie-down about its center point and tilts back toward the rear of the vehicle, while the Woodbury device tilts toward the front of the vehicle. These are specialized two weapon structures, and both occupy an amount of space which would displace a passenger in the vehicle.

U.S. Pat. No. 4,131,202 to Hansen entitled "Console Gun Rack" and which issued on Dec. 26, 1978, discloses an awkward console design wherein the lid of a console box opens to support a plurality of weapons an a very steep angle.

U.S. Pat. No. 3,261,521 to W. R. Meccio et al entitled "Gun Rack" and which issued on Jul. 19, 1966 discloses a fold down design which is much like a conventional gun rack, except that it is folded to the roof of a vehicle, and swings down in a conventional position. This design could be dangerous and difficult to reach, especially given the weight of a loaded weapon or two which the rack must support.

U.S. Pat. No. 4,995,537 to Thedieck entitled "Removable Gun Rack" and which issued on Feb. 26, 1991, discloses a horizontal web extendable between two vertical members of a jeep roll bar. No provision is made for the support of the butt of the weapons. U.S. Pat. No. 3,876,068 to Gomes et al entitled "Portable Gun Rack" and which issued on Apr. 8, 1975, discloses a stand-off mount for a nearly vertical wall section.

None of the above designs allow for a more stealthy design, and which takes up minimum additional seating. None of the above designs are easily portable, or enable the rifle to be carried scope down, in its more stable position.

SUMMARY OF THE INVENTION

The gun rack of the present invention engages the rear of the back seat of a sports vehicle and enables weapons to be carried in a manner tilting toward the front of the vehicle. The rack has no middle struts which would interfere with the scope of rifle and thus allows the rifle to be carried scope down, a much more stable configuration.

The rack of the present invention is completely foldable from and to a storage position, and contains specialized structures to enable tie down. Tie-downs are made with respect to eyelets which exist in the rear of sports vehicles, and tie down is effected through the use of quick release straps. Tie down is achieved both at the upper and lower end of the rack of the present invention. Self tying is achieved through a wrap-around strap, or through a decorative over cover. The decorative over cover helps to disguise the presence of the weaponry and thus to reduce the incidence of theft.

BRIEF DESCRIPTION OF THE DRAWINGS

The invention, its configuration, construction, and operation will be best further described in the following detailed description, taken in conjunction with the accompanying drawings in which:

FIG. 1 is a perspective view of the gun rack of the present invention with two rifles illustrated in phantom, and further illustrated in its environment in the rear of a sports vehicle;

FIG. 2 is a perspective view of the rack of the present invention shown by itself to better illustrate its details;

FIG. 3 is a view illustrating a seat belt tie down and shown with respect to the front of the seat which was shown in FIG. 1;

FIG. 4 is a side view of the rack of the present invention shown in side view;

FIG. 5 is a side view of the rack of the present invention as shown in FIG. 4, but with a decorative over cover shown in outline form.

DETAILED DESCRIPTION OF THE PREFERRED EMBODIMENT

Figure 6:
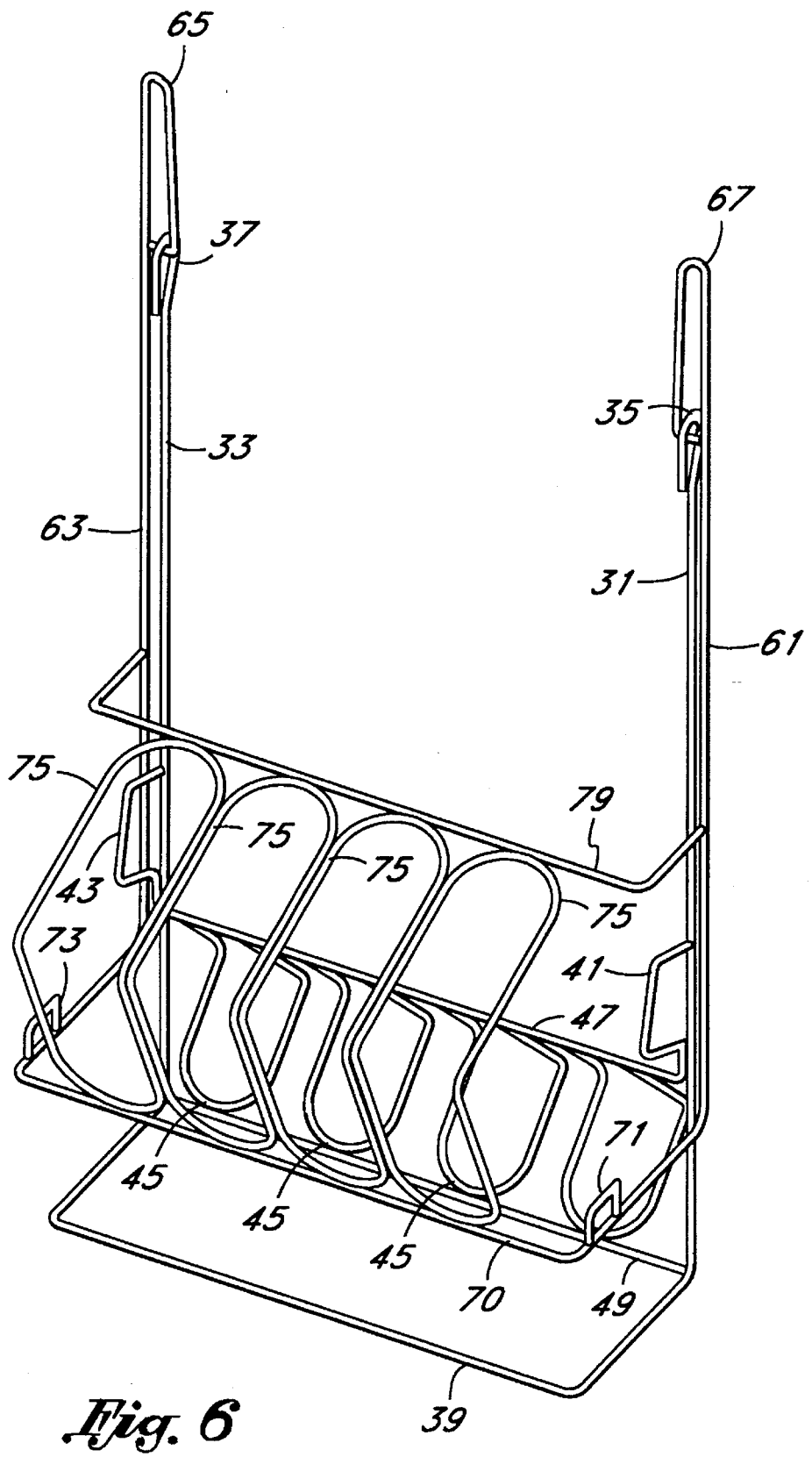
FIG. 6 is a perspective view of the rack of the present invention with the rack shown in folded position.

The description and operation of the invention will be best described with reference to FIG. 1. FIG. 1 illustrates a gun rack of the present invention which will hereinafter be referred to simply as rack 11 of the present invention. Rack 11 is shown in place with respect to two structures of a sports vehicle, including a seat back 13, and a rear storage surface 15. Rear storage surface 15 is also fitted with a series of four tie downs, including front tie downs 17 and 19 and rear tie downs 21 and 23. A seat front 25 is shown as intersecting with the seat back 13.

The rack 11 is made of steel wire, preferably about 0.25 inches in diameter. The finish is preferably painted, dipped, or powder coated to insure a smooth finish. Rack 11 includes an upper portion 27 and a lower portion 29, which will pivot with respect to each other.

The upper portion 27 includes an elongate right loop support 31 and an elongate left loop support 33. At the end of the loop supports 31 and 33 are a pair of loops 35 and 37 which loop about an axis common to each other. An upper portion, downwardly directed lip 39 is shown extending over the seat back 13. Lip 39 is preferably integrally formed with elongate right loop support 31, elongate left loop support 33, and pair of loops 35 and 37, although it is not mandatory.

Attached to the underside of the upper portion 27 are several structures. A tie-down loop 41 is supported by right loop support 31, and a tie-down loop 43 is supported by left loop support 33. Both of the tie-down loops 41 and 43 are downwardly directed with respect to the rack 11. A series of rifle barrel supports 45 are supported across the width of the upper portion 27 at their lower ends by a lower rifle barrel support strut 47. The rifle barrel supports 45 are supported across the width of the upper portion 27 at their upper ends by an upper rifle barrel support strut 49.

Rifle barrel supports 45 are preferably in the shape of a set of partially folded loops. The effective width of the barrel supports 45 is about an inch and a quarter to an inch and a half, wide enough to accommodate the barrel of a rifle or shotgun, but narrow enough to prevent the upper portion of the stock, or magazine or other structure from fitting therethrough. This dimensional arrangement insures that the rifle or shotgun will not slide upwardly through the loop even if the vehicle in which the rack 11 is mounted experiences decelerative forces.

Also, noting the angle of the barrel supports 45, they can be configured to represent a nearly vertical, barrier to the beginning of the relatively wider portion of the gun stock. Note that in the configuration shown in FIG. 1 that the tie-down loops 41 and 43, and the lower rifle barrel support strut 47 are formed of a single length of steel wire. The upper rifle barrel support strut 49 is affixed between the elongate right and left loop supports 31 and 33.

A front tie-down strap 51 extends from a front tie-down 17, through the tie-down loops 43 and 41 and then to the front tie-down 19. It is understood that the tie-down loops 43 and 41 may engage separate tie down straps rather than the tie down strap 51. The tie down strap 51 is fitted with a quick-release buckle 53, and also may have hooks 55 at its opposite ends (one of which is shown) for engaging the tie downs 17 and 19.

Lower portion 29 has an elongate right loop support 61 and an elongate left loop support 63. At the end of the loop supports 61 and 63 are a pair of loops 65 and 67 which loop about a pair of axes which are parallel to each other, and orthogonal to the axes of loops 35 and 37. The loops 65 and 67 are somewhat "P" shaped, and enable the engagement of the loops 35 and 37 about the lower horizontal support of the "P" structure. The upper portion of the "P" structure prevents complete rotation of the loops 35 and 37 about the lower horizontal members of the respective "P" shaped loops 67 and 65.

This is the mechanism which limits the complete near 360° rotation of the upper portion 27 with respect to the lower portion 29 and limits this rotation to about 180°. In FIG. 1, the rack 11 is shown in open position. The loops 35, 37, 65, and 67 will enable the rack 11 to fold in the direction where both the upper portion 27 and the lower portion 29 are brought downwardly to each other.

Note the stability of this design. The rigidity of the loops 35 and 37 with respect to each other, and especially with the axis of the loops being coaxial, will prevent the loops from occupying any portion of the loops 65 and 67 except for the lower portion of the horizontal structure of their "P" shape. The stability of this configuration eliminates the need for specialized bracing, either along either of the elongate right and left loop supports 31 and 33 with respect to the elongate right and left loop supports 61 and 63 or with respect to each other. Further, no cross bracing is required anywhere near the middle two thirds of the rack 11. As can be seen with respect to the rifles which are shown in phantom and labeled 69, their scopes extend freely below. Further, the absence of cross struts also enables the rifles 69 to be carried lower with respect to the rack 11.

With respect to the remaining features of the rack 11, the transition from the elongate right and left loop supports 61 and 63 includes an upwardly directed lip 70 which rises from a curved transition at the rear storage surface 15. Upwardly directed lip 70 is also preferably integrally formed with elongate right loop support 61, elongate left loop support 63, and pair of loops 65 and 67, although it is not mandatory.

Attached to the upper side of the lower portion 29 are several structures. A pair tie-down loops 71 and 73 are supported by the right and left sides of the lip 70. Tiedown loops 71 and 73 are shown as being separately attached, but may be attached to any of the lower portion 29 structures mentioned or to be discussed. A series of rifle butt supports 75 are supported across the width of the lower portion 29 at their lower ends by the width of lip 70. Rifle butt supports 75 and rifle barrel supports 45 act as receiving structures for objects to be supported by said rack 11. The rifle butt supports 75 are supported across the width of the lower portion 29 at their upper ends by an upper rifle butt support strut 79. Upper rifle butt support strut 79 is shown extending upwardly from the lower portion 29 to insure clearance of the upper part of the stocks of the rifles 69 from the rear storage surface 15, if such is necessary. It is understood that the transition from the elongate right and left loop supports 61 and 63 to the lip 70 may include additional structure underneath to provide the additional clearance.

Rifle butt supports 75 are also preferably in the shape of a set of partially folded loops. The effective width of the barrel supports 45 is about two inches, wide enough to accommodate the rear stocks of a rifle or shotgun. The supports 75 may be padded, dipped, or coated to ensure that they will not scratch the rifle 69 or other finish. Note that the supports 75 and 45 may be welded to their adjacent supporting structures, or affixed by any other manner, including brackets and the like.

A rear tie-down strap 81 extends from a rear tie-down 21, through the tie-down loops 73 and 71 and then to the rear tie-down 23. It is understood that the tie-down loops 73 and 71 may engage separate tie down straps rather than the tie down strap 81. The tie down strap 81 is fitted with a quick-release buckle 83, and also may have hooks 55 at its opposite ends (one of which is shown) for engaging the tie downs 21 and 23.

Referring to FIG. 2, a perspective view of the rack 11 is given from an opposite angle, and looking in from the underside, and without its sport vehicle environment and rifles 70, to emphasize the operation of the pivoting connections, including loops 35 and 37 and their engagement with loops 65 and 67 as a contrast to FIG. 1, to better complete the understanding of their operation.

Referring to FIG. 3, the front of the seat back 13 is shown engaging the lip 39 of the rack 11. A conventional seat belt 85 is shown threaded through and engaging the lip 39. It is understood that the front edge of the lip 39 need not be straight and that lip 39 may be fashioned to center or fix the engagement of the seat belt 85 with respect to rack 11. Seat belt 85 acts to anchor the rack 11 with respect to its upper portion 27. Referring back to FIG. 1, note that the downward pull from the tie-down loops 43 and 41 helps to engage upper portion 27 onto the seat back 13, and puts some pressure onto the transition points between the upper portion 27 and 29. Thus, the engagement with the seat belt 85 of FIG. 3 acts to further stabilize by providing additional downward pressure onto the upper portion 27.

Referring to FIG. 4, a side view gives some additional idea of the profile and clearances had with respect to the seat back 13 and rear storage surface 15. Note how the upper rifle butt support strut 79 "raises" the level of the rifle 69 stock and helps prevent the stock coming near the rear storage surface 15. In the rifle 69 shown, the upper portion of the stock has a gentle taper, but other rifles 69 may have a more severe taper.

An optional strap 87 and quick release buckle 89 may be used to secure the rifles 69 onto the rack 11 by simply encircling the rack 11 and rifles 69 when the rifles 69 are in place with respect to the rack 11.

Referring to FIG. 5, an optional over cover 91 is shown. The over cover 91 may have fitted ends to better fit around the rack 11 while the rifles 69 are in place. The over cover 91 may be decoratively printed to simulate and suggest a baby carriage, back pack, or other structure. The upper end of the over cover 91 may be made in the form of a pouch to fit around the barrel ends of the rifles 69. Further, instead of an outer, independent strap 87, the edges of the over cover 91 may have strapping sewn to it, with tension on the strapping creating tension on the mid section of the over cover 91.

This is shown in FIG. 5, where strap portions 95 are joined by a quick release buckle 97. The over cover 91 also further acts to prevent motion of the rifles 69 in a direction forward with respect to the rack 11. The bottom of the over cover 91 may or may not be of fitted shape, and where not fitted, may be tucked under the bottom of the rack 11.

Referring to FIG. 6, the rack 11 is shown in a position where it is completely folded up, where the under sides of the structure shown in FIGS. 1–5 are brought together. This folded rack 11 structure may be easily transported and stored when not used. It is suggested, as is shown in FIG. 6, that the width of the lower portion 29, having the "P" shaped loops 67 and 65 be made slightly wider than the upper portion 27 to facilitate the partial interfitting of the extreme ends of the upper portion 27 into the lower portion 29 to further conserve space in the folded condition.

Further note that the embodiment shown in FIGS. 1–3 illustrate the capacity of four rifles 70. The rack 11 may be made of any width to accommodate from one to as many rifles 70 as are needed.

While the present invention has been described in terms of a foldable, portable gun rack and securing over cover, one skilled in the art will realize that the structure and techniques of the present invention can be applied to such appliances.

The present invention may be applied in any situation where sturdy, safe, protected and encased support is needed for valuable and delicate objects.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A gun rack comprising:

an upwardly disposed rifle barrel support supported by an upper end of an upper portion of said gun rack;

an upwardly disposed rifle bumt support supported by a lower end of a lower portion of said gun rack, and wherein said upper portion of said gun rack is pivotable with respect to said lower portion of said gun rack from an open position about a central axis to a position where said rifle barrel support is adjacently disposed with respect to said rifle butt support; and, said lower portion of said gun rack further including a pair of "P" shaped elongated loops each having a first segment disposed on said central axis and an opposite segment spaced from said first segment, each opposite segment defining a support disposed parallel to said central axis and wherein said upper portion of said gun rack has a pair of loops each pivotally engaging said first segments, respectively, of the "P" shaped loops of said lower portion of said gun rack, said opposite segments of said "P" shaped loops adapted to overlie and abut said upper position to support said upper and lower portions in said open position.

2. The gun rack recited in claim 1 wherein said upper portion of said gun rack further comprises at least one tie-down loop.

3. The gun rack recited in claim 1 wherein said lower portion of said gun rack further comprises at least one tie-down loop.

4. The gun rack recited in claim 1 wherein said upper portion further comprises a first elongate rod having a first loop at its first end and a second loop at its second end and defining a symmetrical lip therebetween, for supporting said rifle barrel support.

5. The gun rack recited in claim 1 wherein said lower portion further comprises an elongate rod having a first loop at its first end and a second loop at its second end and defining a symmetrical upwardly disposed lip therebetween, for supporting said rifle butt support.

6. The gun rack of claim 5 and further comprising an upper rifle butt support strut connected between two points on said elongate rod and wherein said rifle butt support is supported by said upper rifle barrel support strut and said upwardly disposed lip.

7. The gun rack of claim 6 wherein said elongate rod supports a pair of spaced apart tie-down loops, and further comprising at least one tie-down strap, engaging at least one of said tie-down loops for anchoring the lower end of said rack to an interior portion of a vehicle.

8. The gun rack of claim 6 wherein said second elongate rod supports a pair of spaced apart tie-down loops, and further comprising at least one tie-down strap, engaging at least one of said tie-down loops and anchoring the lower end of said rack to an interior portion of a vehicle.

9. The gun rack of claim 1 and further comprising an over cover fitted over said upper and lower portion of said rack when said rack is pivoted, to a position where said rifle barrel support will be adjacently disposed with respect to said rifle butt support.

10. The gun rack of claim 9 and further comprising:
a first strap portion having a female buckle at a first end and having a second end connected to said over cover; and
a second strap portion having a male buckle, interlockably fittable with said female buckle, at a first end and having a second end connected to said over cover.

11. A gun rack comprising:
an upwardly disposed rifle barrel support supported by an upper portion of said gun rack, said upper portion further comprising a first elongate rod having a first loop at its first end and a second loop at its second end and defining a symmetrical lip therebetween, and supporting said rifle barrel support;
an upper rifle barrel support strut connected between two points on said first elongate rod; and
a lower rifle barrel support strut connected between two points on said first elongate rod, generally parallel to and spaced apart from said upper rifle barrel support, and wherein said rifle barrel support is supported by said upper and lower rifle barrel support struts;
an upwardly disposed rifle butt support supported by a lower portion of said gun rack, and wherein said upper portion of said gun rack is pivotable about a central axis with respect to said lower portion of said gun rack to a position where said rifle barrel support will be adjacently disposed with respect to said rifle butt support.

12. The gun rack of claim 11 wherein said first elongate rod supports a pair of spaced apart tie-down loops, and further comprising at least one tie-down strap, engaging at least one of said tie-down loops for anchoring said rack and to an interior portion of a vehicle.

13. The gun rack recited in claim 12 wherein said lower portion further comprises a second elongate rod having a first loop at its first end and a second loop at its second end and defining a symmetrical downwardly disposed lip therebetween, supporting said rifle butt support.

14. The gun rack of claim 13 and further comprising an upper rifle butt support strut connected between two points on said second elongate rod and wherein said rifle butt support is supported by said upper rifle barrel support strut and said upwardly disposed lip.

* * * * *